March 31, 1936.　　　E. V. FRANCIS　　　2,035,873
MATERIAL HANDLING MECHANISM
Filed April 8, 1933　　　2 Sheets-Sheet 1
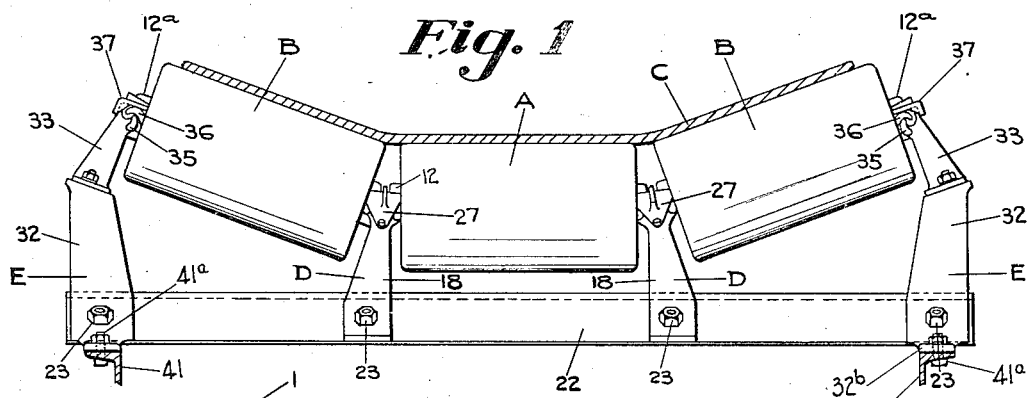
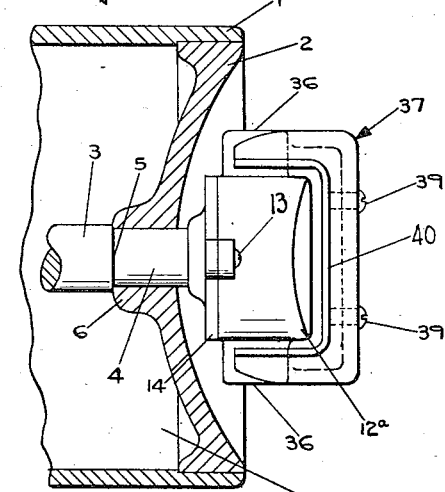
Fig. 7
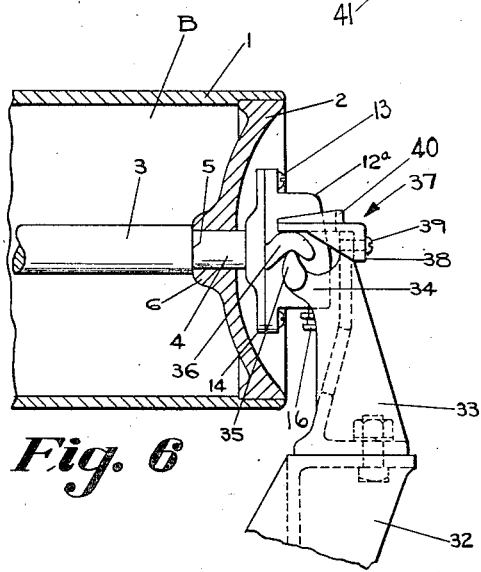
Fig. 6
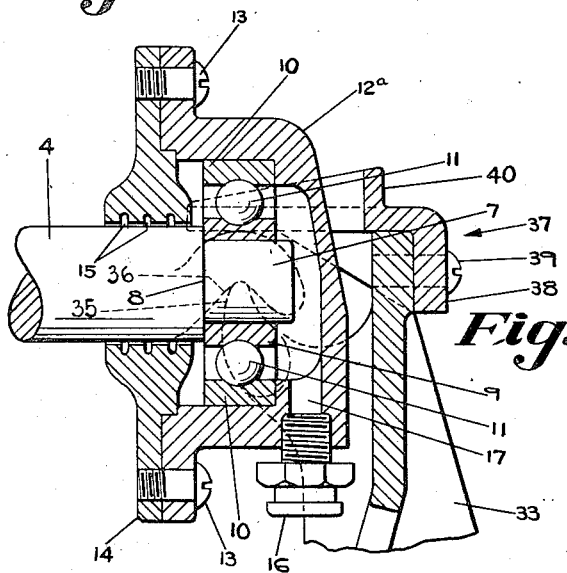
Fig. 2
INVENTOR:
Earle V. Francis,
By
Chas. M. Nissen,
ATT'Y.

March 31, 1936.  E. V. FRANCIS  2,035,873

MATERIAL HANDLING MECHANISM

Filed April 8, 1933   2 Sheets-Sheet 2

INVENTOR:
Earle V. Francis
BY
Chas. M. Niesen,
ATT'Y.

Patented Mar. 31, 1936

2,035,873

UNITED STATES PATENT OFFICE 2,035,873

MATERIAL HANDLING MECHANISM

Earle V. Francis, Columbus, Ohio, assignor to The Jeffrey Manufacturing Company, a corporation of Ohio Application April 8, 1933, Serial No. 665,123

2 Claims. (Cl. 308—20)

In material handling mechanism of the type employing an endless belt conveyor, the belt passes over carriers comprising rollers supported on suitable standards, in end to end relation, forming roller units extending transversely of the belt. Each of these units comprises at least one intermediate roller, together with end rollers, and, where it is desired to impart a trough-like shape to the belt, the end rollers are inclined upwardly in opposite directions.

In continued service, it becomes necessary from time to time to remove certain of the rollers of the respective units for repair or replacement of worn parts, or for other purposes, and accordingly it is desirable to provide mounting means for the rollers which will enable ready removal of any roller of a unit from its mounting, independent of the remaining rollers of the unit, it being also desirable that the mounting means be of such a character as will allow ready adjustment of the roller upon replacement thereof upon its mounting, thereby reducing the manipulations of the roller during replacement operations.

As usually constructed, these rollers comprise a shaft extending through the roller coincident with the longitudinal axis thereof, the shaft extending a short distance beyond the ends of the roller. Intermediate the ends of roller and shaft, there are positioned anti-friction bearings, each of which engages the shaft adjacent each end thereof, and which, in turn, is enclosed by a suitable housing secured in position on the shaft. These housings rest in suitable brackets which carry the rollers. During operation of the roller, frictional wear occurs around the movable and stationary parts of the bearing, so that, from time to time, the bearing must be replaced, this operation requiring the demounting of the roller and the removal of the housing cover in order to gain access to the interior of the housing.

When the worn parts are replaced, and the housing caps remounted in position, the various parts may not occupy exactly the same position as they did previously, so that additional adjustment and manipulation of the parts may be necessary in order to reposition, properly, the roller between the supporting standards.

The present invention deals with improved mounting instrumentalities for rollers of this general type, which instrumentalities result, in effect, in making the roller self-adjusting under the conditions above referred to, eliminating the possibility of the roller binding between the supporting brackets as the roller is remounted.

The mounting instrumentalities of the present invention also include devices for a preventing accidental displacement of the rollers from the supporting brackets, the devices being, nevertheless, removable to enable removal of the rollers for purposes of repair, or other purposes, as aforesaid.

The present invention also includes a novel construction of supporting bracket which is adapted to cooperate wth complemental members on the roller housings, as aforesaid, the supporting brackets comprising an integral casting including two substantially parallel plates interconnected with a reinforcing web, the said plates being formed with diverging foot portions or members adapted to be clamped by bolts, or equivalent fastening means, to the sides of an angular support or carrier for the roll unit. The upper corners of each plate are provided with knife edge supports adapted to cooperate with complemental lugs on the housing member previously referred to.

The details of the present construction will be clear from a consideration of the accompanying drawings, which illustrate one form of the invention, and in which:

Fig. 1 represents an assembled conveyor belt troughing idler unit;

Fig. 2 is a detailed sectional view showing certain features of the mounting of the outer end of the end rollers of the unit;

Fig. 6 is a fragmentary view of the outer end of the end roller shown in Fig. 1, showing the mounting thereof; and Fig. 7 is a plan view of the parts shown in Fig. 6.

Figure 3:
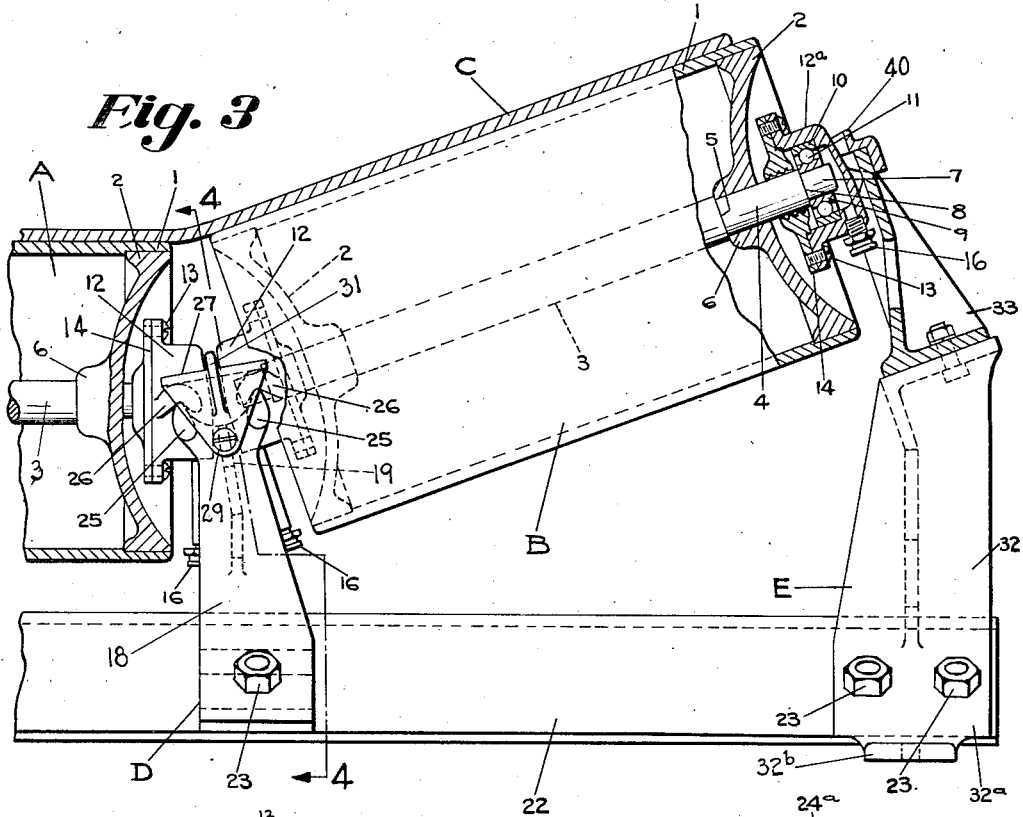
Fig. 3 represents a fragmentary view of a portion of the roller unit of Fig. 1 illustrating the improved mounting of the rollers, the view being partly in section and partly in elevation.
Figure 4:
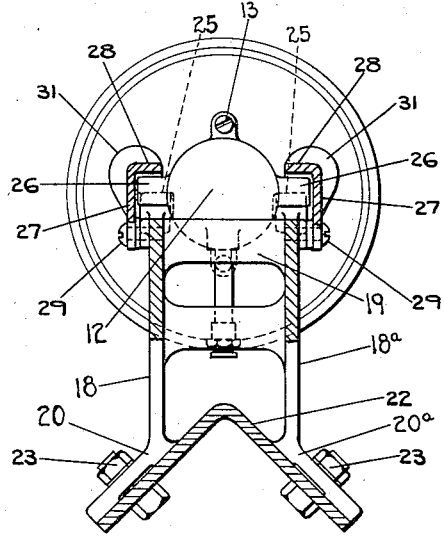
Fig. 4 is a sectional view taken on the line 4—4 of Fig. 3.
Figure 5:
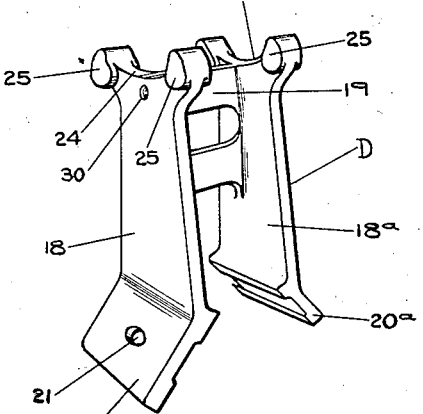
Fig. 5 is a perspective view of one of the intermediate supporting brackets.

Referring more particularly to the drawings, it will be understood that Fig. 1 illustrates a roller unit for endless conveyor belts, which unit may be made up of any number of rollers mounted in a manner similar to those illustrated. In Fig. 1 a horizontal or intermediate roller is represented at A, terminal rollers being shown at B, these latter rollers being illustrated as inclined to produce the desired troughing effect on the conveyor belt C. The rollers are supported on intermediate brackets D and end brackets E, the end brackets being slightly different in their detailed construction from the intermediate brackets.

Each roller being of the same mechanical construction, only one of them need be described in detail.

It will be seen that each roller, say roller B, is formed of a hollow cylinder 1, each end of which is closed by a concave end closure member 2, through which extends the axially disposed shaft 3, the ends of which shaft project a suitable distance beyond the ends of the roller. The end closure members 2 are apertured to receive the shaft 3, the diameter of which is decreased at 4 to form a shoulder 5 against which bears a central collar 6 of the end members 2. The shaft 3 is further reduced in diameter adjacent each end, as indicated at 7, defining a shoulder 8 against which is positioned an anti-friction bearing comprising a ball race, the inner part 9 of which rotates with the shaft as the roller rotates, the outer section 10 being stationary. The ball bearings intermediate the sections of the race are indicated at 11. The ball race is held in position by engagement of section 10 with the inner wall of a cap 12 or 12a, which fits snugly over the race and which forms a housing enclosing the bearing and end of the shaft. It may be mentioned, that the end caps are designated 12a while the intermediate caps are designated 12, there being slight structural differences between them which are obvious. The cap 12 or 12a is secured by screws, or equivalent fastening devices, 13 to a collar 14, having an annular opening through the center thereof for receiving the shaft 3, the wall of the opening being spaced somewhat from the shaft, and being provided with grooves 15 for forming a lubricant seal for preventing escape of lubricant from around the bearing and shaft end.

For supplying lubricant, the cap 12a is apertured to receive a fitting 16 for a pressure lubricating device, such as a grease gun, lubricant flowing therefrom into the space 17, filling this space, and immersing the bearing and end of the shaft in a pool of lubricant. This lubricant, flowing into the grooves 15, fills these grooves and hardens, thereby sealing the bearing housing against leakage of lubricant; or the grooves may be sealed by a packing of felt.

It will be understood that this construction is repeated at each end of the roller.

The caps 12 and 12a rest in supporting brackets, and carry the rollers. Referring first to the intermediate supports, typified by support D, it will be seen that the support includes the plates 18 and 18a joined by web 19 integral with these plates. The plates are bent at their lower edges to form the diverging flange portions 20 and 20a, provided with openings 21 therethrough. These flange portions are seated on the sides of the angular base support 22, provided with holes adapted to register with holes 21, for receiving bolts 23, by means of which the supports are rigidly secured in place. The upper edges 24 and 24a of the plates 18 and 18a are somewhat concaved, as clearly shown in Fig. 3, to facilitate seating the caps 12. The upper corners of each plate are formed into knife edge bearings 25, adapted to engage arcuate lugs or ears 26 extending laterally from the caps 12 and integral therewith. To lock the lugs 26 and knife edge bearings 25 together, locking plates 27 are provided, which are conveniently of triangular configuration to cover corresponding lugs of adjacent rollers, and which are provided with inwardly projecting flanges 28 for overlapping the lugs 26, thereby locking these lugs to the bearings 25. The locking plates 27 are secured to the supports by a fastening screw, or equivalent securing member 29, passed through a hole provided for the purpose in plates 27, and into holes 30 in the supports. The plates 27 are provided with a reinforcing rib 31.

The terminal supports E are of a construction generally similar to that just described, but are modified to meet the particular positional requirements. For supporting the roller B at its proper angle for suitably troughing the belt C, the terminal support E is formed in two sections, indicated respectively, at 32 ond 33 which are suitably secured together, the lower end of section 32 being formed of diverging plates 32a, one of which is secured to each side of the angular support 22 by bolts 23 as aforesaid, and having the foot pieces 32b integral therewith for supporting the unit on longitudinal supports or stringers 41. The foot pieces 32b projecting from the plates 32a are secured to the stringers by bolts 41a.

The details of the construction of the section 33 are shown in Figs. 2 and 3, from which figures it will be seen that the section 33 has an off-set portion 34 forming a seat for the cap 12a and formed with knife edge bearings 35 similar to the bearings 25 previously described. These bearings 35 engage the arcuate lugs 36 of the cap 12a, these lugs 36 being entirely similar to the lugs 26 described before. For locking these lugs 36 with the knife edges 35, there is provided a substantially U-shaped locking plate 37, having a depending flange 38 enclosing the upper end of the supporting section 33, and secured thereto by fastening members 39, the sides of this U-shaped locking plate overhanging the lugs 36 to interlock them against the bearings 35. A reinforcing rib 40 extends around the locking plate.

For dismounting the rollers from their supports, the respective locking plates are first removed, and the rollers lifted off. When the rollers are replaced the curvature of the lugs 26, 36 is such that the lugs are free to move relative to the knife edges and thus automatically properly aline the roller between its supports. The locking plates are then applied and secured in position, thus securing the roller against displacement and holding it in proper position.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In a conveyor, the combination with a base, of a standard mounted thereon, spaced-apart knife-edge supports at the upper end of said standard, a journal bearing comprising an enclosing cap, spaced-apart lugs carried by said cap at opposite sides thereof and each provided with a recess on its under side in position to engage one of said knife edges to support said bearing, a belt carrying roller with one end journaled in said bearing, and non-load-carrying means on said standard in position to engage the upper sides of said lugs to retain the same in position against said knife-edge supports.

2. In a belt conveyor apparatus, the combination with two rollers having journal bearings adjacent to each other, of mechanism for mounting said journal bearings each for tilting movements on an axis extending transversely of its roller axis while being confined against movement about its roller axis, and means comprising a pair of retaining devices L-shaped in cross-section removably mounted on opposite sides of said mechanism and extending over and above said transverse axes to lock said bearings in such confined position.

EARLE V. FRANCIS.